(12) United States Patent
Maeda

(10) Patent No.: US 11,193,581 B2
(45) Date of Patent: Dec. 7, 2021

(54) CAUSE IDENTIFYING DEVICE

(71) Applicant: TOYOTA JIDOSHA KABUSHIKI KAISHA, Toyota (JP)

(72) Inventor: Toshio Maeda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/034,509

(22) Filed: Sep. 28, 2020

(65) Prior Publication Data
US 2021/0222771 A1   Jul. 22, 2021

(30) Foreign Application Priority Data
Jan. 21, 2020 (JP) .............................. JP2020-007559

(51) Int. Cl.
*F16H 59/72* (2006.01)
*F16H 63/50* (2006.01)
*F16H 57/04* (2010.01)

(52) U.S. Cl.
CPC ............ *F16H 59/72* (2013.01); *F16H 63/502* (2013.01); *F16H 57/0413* (2013.01); *F16H 57/0475* (2013.01)

(58) Field of Classification Search
CPC .... F16H 59/72; F16H 63/502; F16H 57/0413; F16H 57/0475
See application file for complete search history.

(56) References Cited

U.S. PATENT DOCUMENTS

2007/0265135 A1   11/2007  Ido
2021/0107497 A1*   4/2021  Kitahata ........... B60W 50/0205

FOREIGN PATENT DOCUMENTS

| CN | 206175632 U | * | 5/2017 | ............ F16H 57/04 |
| JP | 09049564 A | * | 2/1997 | ............ F16H 59/68 |
| JP | 2006-214488 A | | 8/2006 | |
| JP | 2014088806 A | * | 5/2014 | ............ F16D 29/04 |

OTHER PUBLICATIONS

Machine translation of JP 09049564 filed May 19, 2021 (Year: 2021).*

* cited by examiner

*Primary Examiner* — Tisha D Lewis
(74) *Attorney, Agent, or Firm* — Oliff PLC

(57) ABSTRACT

A cause identifying device performs: determining that an operation of a transmission with a predetermined high load is a cause of oil temperature of hydraulic oil having been equal to or higher than the predetermined temperature when predetermined conditions that the transmission has operated with the predetermined high load in a target period immediately before the oil temperature of the hydraulic oil has been equal to or higher than the predetermined temperature and a vehicle acceleration in the target period has been equal to or higher than a predetermined acceleration value are satisfied; and determining that occurrence of a predetermined abnormality associated with a gear shifting device is the cause of the oil temperature of the hydraulic oil having been equal to or higher than the predetermined temperature when the predetermined conditions are not satisfied.

4 Claims, 5 Drawing Sheets

|  | C1 | C2 | B1 | B2 | F1 |
|---|---|---|---|---|---|
| 1st | ○ | - | - | (○) | ○ |
| 2nd | ○ | - | ○ | - | - |
| 3rd | ○ | ○ | - | - | - |
| 4th | - | ○ | ○ | - | - |
| R. | ○ | - | - | ○ | - |

* "○": ENGAGED, "-": RELEASE

|  | C1 | C2 | B1 | B2 | F1 |
|---|---|---|---|---|---|
| 1st | ○ | - | - | (○) | ○ |
| 2nd | ○ | - | ○ | - | - |
| 3rd | ○ | ○ | - | - | - |
| 4th | - | ○ | ○ | - | - |
| R. | ○ | - | - | ○ | - |
|  | * "○": ENGAGED, "-": RELEASE | | | | | ns
CAUSE IDENTIFYING DEVICE

CROSS-REFERENCE TO RELATED APPLICATION

This application claims priority to Japanese Patent Application No. 2020-007559 filed on Jan. 21, 2020, incorporated herein by reference in its entirety.

BACKGROUND

1. Technical Field

The present disclosure relates to a cause identifying device.

2. Description of Related Art

In the related, a type of technique such as detecting an abnormality of an oil cooler which is provided in the vicinity of a radiator in a cooling system of an automatic transmission that cools a hydraulic oil (ATF) of the automatic transmission using the oil cooler has been proposed (for example, see Japanese Unexamined Patent Application Publication No. 2006-214488 (JP 2006-214488 A)). In such a cooling system, a determination temperature is calculated using an oil temperature increase of the hydraulic oil based on a rotation speed of an output shaft of the automatic transmission and a time and an oil temperature decrease of the hydraulic oil based on the oil temperature of the hydraulic oil and a time when the oil cooler is normal, and it is determined that an abnormality has occurred in the oil cooler when the calculated determination temperature is higher than an oil cooler abnormality determination temperature.

SUMMARY

In the cooling system, when the oil cooler is normal and the oil temperature of the hydraulic oil is equal to or higher than a predetermined temperature, it cannot be determined whether occurrence of a predetermined abnormality associated with a gear shifting device including the automatic transmission is a cause of the oil temperature of the hydraulic oil reaching the predetermined temperature.

A cause identifying device according to the present disclosure is provided mainly for identifying a cause when an oil temperature of a hydraulic oil becomes equal to or higher than a predetermined temperature in a gear shifting device including a transmission.

The cause identifying device according to the present disclosure employs the following configurations.

According to the present disclosure, there is provided a cause identifying device that identifies a cause when an oil temperature of a hydraulic oil of a gear shifting device including a transmission which transmits power from a drive source to driving wheels by gear shifting has been equal to or higher than a predetermined temperature, the cause identifying device performing: determining that an operation of the transmission with a predetermined high load is a cause of the oil temperature of the hydraulic oil having been equal to or higher than the predetermined temperature when predetermined conditions that the transmission has operated with the predetermined high load in a target period immediately before the oil temperature of the hydraulic oil has been equal to or higher than the predetermined temperature and a vehicle acceleration in the target period has been equal to or higher than a predetermined acceleration value are satisfied; and determining that occurrence of a predetermined abnormality associated with the gear shifting device is the cause of the oil temperature of the hydraulic oil having been equal to or higher than the predetermined temperature when the predetermined conditions are not satisfied.

In the cause identifying device according to the present disclosure, when an oil temperature of a hydraulic oil of a gear shifting device including a transmission which transmits power from a drive source to driving wheels by gear shifting has been equal to or higher than a predetermined temperature, it is determined that an operation of the transmission with a high load is a cause of the oil temperature of the hydraulic oil having been equal to or higher than the predetermined temperature when predetermined conditions that the transmission has operated with the predetermined high load in a target period immediately before the oil temperature of the hydraulic oil has been equal to or higher than the predetermined temperature and the vehicle acceleration in the target period has been equal to or higher than a predetermined acceleration value are satisfied, and it is determined that occurrence of a predetermined abnormality associated with the gear shifting device is the cause of the oil temperature of the hydraulic oil having been equal to or higher than the predetermined temperature when the predetermined conditions are not satisfied. When the transmission has operated with the predetermined high load in the target period, an amount of heat which has been emitted from the transmission in the target period is higher in comparison with a case in which the transmission has not operated with the predetermined high load (has operated with a low load) in the target period. When the vehicle acceleration in the target period is high, an amount of contact between constituent parts of the transmission and the hydraulic oil and an amount of heat which has been exchanged therebetween is higher in the target period in comparison with a case in which the vehicle acceleration in the target period is low. Accordingly, when the amount of heat which has been emitted from the transmission in the target period is great and the amount of heat which has been exchanged between the constituent parts of the transmission and the hydraulic oil is large, it is considered that the gear shifting device is normal even if the oil temperature of the hydraulic oil reaches the predetermined temperature. On the other hand, when the amount of heat which has been emitted from the transmission in the target period is small and when the amount of heat which has been exchanged between the constituent parts of the transmission and the hydraulic oil is small, it is assumed that a predetermined abnormality has occurred when the oil temperature of the hydraulic oil reaches the predetermined temperature. Accordingly, it is possible to identify the cause of the oil temperature of the hydraulic oil having been equal to or higher than the predetermined temperature using the above-mentioned predetermined conditions.

The cause identifying device according to the present disclosure may perform determining whether the transmission has operated with the predetermined high load in the target period based on at least one of an accelerator operation amount, a vehicle speed, a rotation speed of the drive source, a gear stage of the transmission, and a temperature of a refrigerant in a cooling device that cools the hydraulic oil in the target period.

In the cause identifying device according to the present disclosure, the predetermined abnormality may be an abnormality associated with the hydraulic oil. In this case, the predetermined abnormality may include at least one of an abnormality of an excess amount of hydraulic oil, an abnormality of deterioration of the hydraulic oil, and an abnormality of a cooling device that cools the hydraulic oil.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
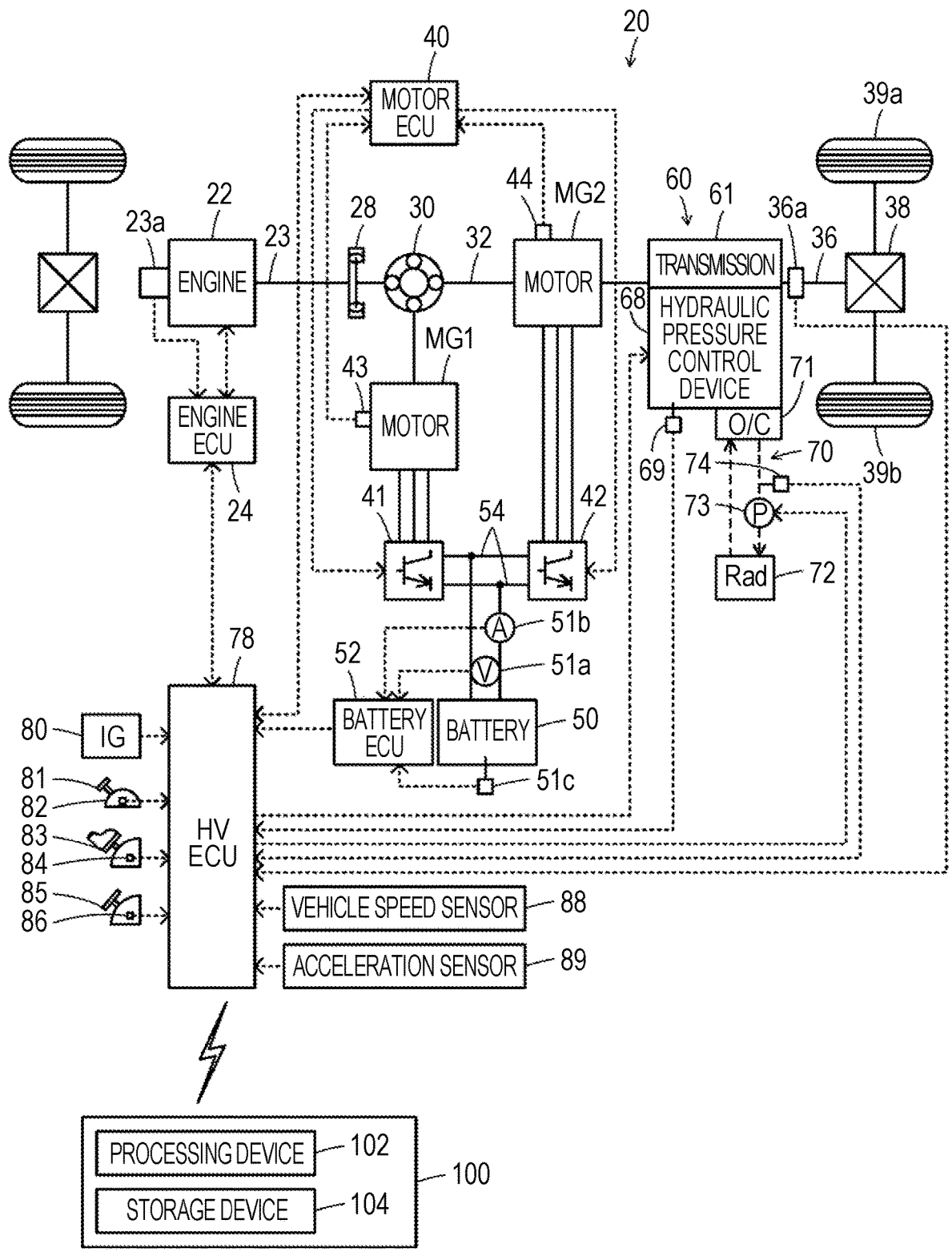
FIG. 1 is a diagram schematically illustrating a configuration of a hybrid vehicle 20 and a cloud server 100 according to an embodiment of the present disclosure.
Figures 2, 3:
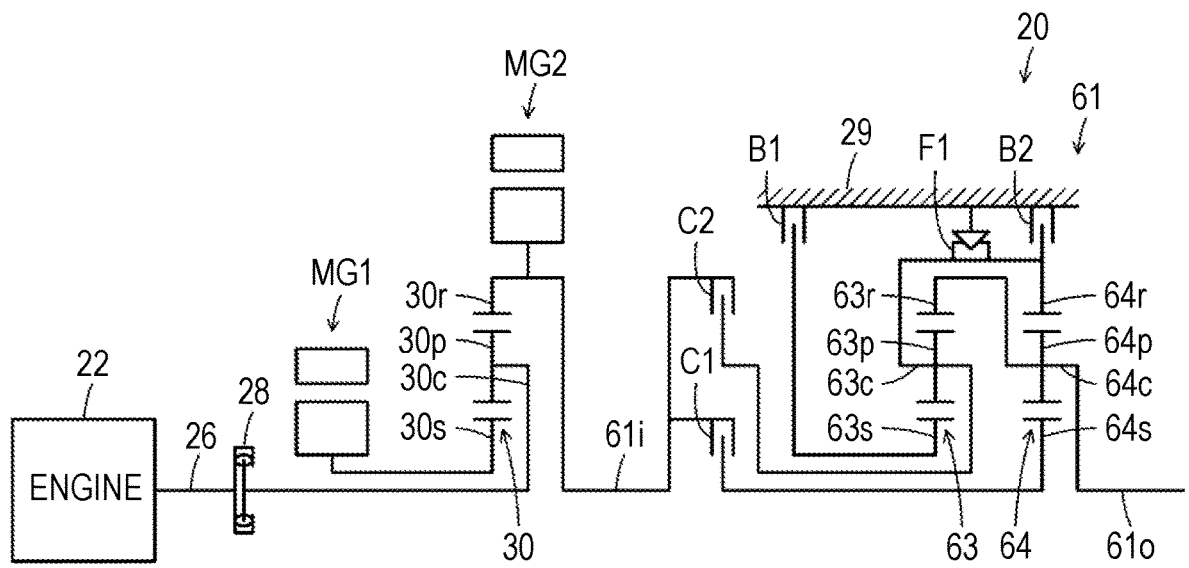
FIG. 2 is a diagram schematically illustrating a configuration of an engine 22, a planetary gear 30, motors MG1 and MG2, and a transmission 61 of a gear shifting device 60.
FIG. 3 is an operation table illustrating a relationship between gear stages of the transmission 61 and operation states of clutches C1 and C2, brakes B1 and B2, and a one-way clutch F1.

Hereinafter, an embodiment of the present disclosure will be described with reference to the accompanying drawings. FIG. 1 is a diagram schematically illustrating a configuration of a hybrid vehicle 20 and a cloud server 100 according to an embodiment of the present disclosure. FIG. 2 is a diagram schematically illustrating a configuration of an engine 22, a planetary gear 30, motors MG1 and MG2, and a transmission 61 of a gear shifting device 60. As illustrated in FIGS. 1 and 2, the hybrid vehicle 20 according to this embodiment includes an engine 22, a planetary gear 30, motors MG1 and MG2, inverters 41 and 42, a battery 50, a gear shifting device 60, and a hybrid-vehicle electronic control unit (hereinafter referred to as an "HVECU") 78.

The engine 22 is configured as an internal combustion engine that outputs power using gasoline, diesel, or the like as fuel. The engine 22 is operationally controlled by an engine electronic control unit (hereinafter referred to as an "engine ECU") 24.

The engine ECU 24 includes a microprocessor including a CPU, a ROM, a RAM, input and output ports, and a communication port. Signals from various sensors which are required for operationally controlling the engine 22 are input to the engine ECU 24 via the input port. Examples of the signals input to the engine ECU 24 include a crank angle θcr from a crank position sensor 23a that detects a rotational position of a crank shaft 23 of the engine 22. Various control signals for operationally controlling the engine 22 are output from the engine ECU 24 via the output port. The engine ECU 24 is connected to the HVECU 78 via the communication port. The engine ECU 24 calculates a rotation speed Ne of the engine 22 based on the crank angle θcr from the crank position sensor 23a.

The planetary gear 30 is configured as a single pinion type planetary gear mechanism. The planetary gear 30 includes a sun gear 30s which is an external gear, a ring gear 30r which is an internal gear, a plurality of pinion gears 30p which engages respectively with the sun gear 30s and the ring gear 30r, and a carrier 30c that supports the plurality of pinion gears 30p such that they can rotate and revolve. The sun gear 30s is connected to a rotor of the motor MG1. The ring gear 30r is connected to a rotor of the motor MG2 and an input shaft 61i of the transmission 61 of the gear shifting device 60 via a transmission member 32. The carrier 30c is connected to the crank shaft 23 of the engine 22 via a damper 28.

Each of the motors MG1 and MG2 are configured, for example, as a synchronous generator motor. As described above, the rotor of the motor MG1 is connected to the sun gear 30s of the planetary gear 30. The rotor of the motor MG2 is connected to the ring gear 30r of the planetary gear 30 and the input shaft 61i of the transmission 61 via the transmission member 32 as described above. The inverters 41 and 42 are used to drive the motors MG1 and MG2 and are connected to the battery 50 via a power line 54. The motors MG1 and MG2 are rotationally driven by causing a motor electronic control unit (hereinafter referred to as a "motor ECU") 40 to control switching of a plurality of switching elements (not illustrated) of the inverters 41 and 42.

The motor ECU 40 includes a microprocessor including a CPU, a ROM, a RAM, input and output ports, and a communication port. Signals from various sensors which are required for operationally controlling the motors MG1 and MG2 are input to the motor ECU 40 via the input port. Examples of the signals input to the motor ECU 40 include rotational positions θm1 and θm2 of the rotors of the motors MG1 and MG2 from rotational position sensors 43 and 44 that detect rotational positions of the rotors of the motors MG1 and MG2 and phase currents Iu1, Iv1, Iu2, and Iv2 of the motors MG1 and MG2 from current sensors that detect phase currents flowing in phases of the motors MG1 and MG2. Switching control signals for the plurality of switching elements (not illustrated) of the inverters 41 and 42 and the like are output from the motor ECU 40 via the output port. The motor ECU 40 is connected to the HVECU 78 via the communication port. The motor ECU 40 calculates electrical angles θe1 and θe2 and rotation speeds Nm1 and Nm2 of the motors MG1 and MG2 based on the rotational positions θm1 and θm2 of the rotors of the motors MG1 and MG2 from the rotational position sensors 43 and 44.

The battery 50 is configured, for example, as a lithium-ion secondary battery or a nickel-hydride secondary battery. The battery 50 is connected to the inverters 41 and 42 via the power line 54 as described above. The battery 50 is controlled by a battery electronic control unit (hereinafter referred to as a "battery ECU") 52.

The battery ECU 52 includes a microprocessor including a CPU, a ROM, a RAM, input and output ports, and a communication port. Signals from various sensors which are required for controlling the battery 50 are input to the battery ECU 52 via the input port. Examples of the signals input to the battery ECU 52 include a voltage Vb of the battery 50 from a voltage sensor 51a that is attached between the terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 78 via the communication port. The battery ECU 52 calculates a state of charge SOC of the battery 50 based on an integrated value of the current Ib of the battery 50 from the current sensor 51b. The state of charge SOC refers to a ratio of the capacity of electric power which can be discharged from the battery 50 to the total capacity of the battery 50.

The gear shifting device 60 includes a transmission 61, a hydraulic pressure control device 68 that supplies a hydraulic oil (ATF) to the transmission 61, and a cooling device 70 that cools the hydraulic oil. The transmission 61 is configured as a four-stage stepped transmission and includes an input shaft 61i, an output shaft 61o, planetary gears 63 and 64, clutches C1 and C2, brakes B1 and B2, and a one-way clutch F1. The input shaft 61i is connected to the ring gear 30r of the planetary gear 30 and the motor MG2 via the transmission member 32 as described above. The output shaft 61o is connected to a drive shaft 36 connected to driving wheels 39a and 39b via a differential gear 38.

The planetary gear 63 is configured as a single pinion type planetary gear mechanism. The planetary gear 63 includes a sun gear 63s which is an external gear, a ring gear 63r which is an internal gear, a plurality of pinion gears 63p which engages respectively with the sun gear 63s and the ring gear 63r, and a carrier 63c that supports the plurality of pinion gears 63p such that they can rotate and revolve.

The planetary gear 64 is configured as a single pinion type planetary gear mechanism. The planetary gear 64 includes a sun gear 64s which is an external gear, a ring gear 64r which is an internal gear, a plurality of pinion gears 64p which engages respectively with the sun gear 64s and the ring gear 64r, and a carrier 64c that supports the plurality of pinion gears 64p such that they can rotate and revolve.

The carrier 63c of the planetary gear 63 and the ring gear 64r of the planetary gear 64 are connected (fixed) to each other. The ring gear 63r of the planetary gear 63 and the carrier 64c of the planetary gear 64 are connected (fixed) to each other. Accordingly, the planetary gear 63 and the planetary gear 64 serve as a so-called 4-element mechanism including the sun gear 63s of the planetary gear 63, the carrier 63c of the planetary gear 63 and the ring gear 64r of the planetary gear 64, the ring gear 63r of the planetary gear 63 and the carrier 64c of the planetary gear 64, and the sun gear 64s of the planetary gear 64 as four rotary elements. The ring gear 63r of the planetary gear 63 and the carrier 64c of the planetary gear 64 are connected (fixed) to the output shaft 61o.

The clutch C1 connects the input shaft 61i and the sun gear 64s of the planetary gear 64 to each other and disconnects both from each other. The clutch C2 connects the input shaft 61i and the carrier 63c of the planetary gear 63 and the ring gear 64r of the planetary gear 64 to each other and disconnects both from each other. The brake B1 fixes (connects) the sun gear 63s of the planetary gear 63 to a transmission case 29 which is a stationary member such that they cannot rotate and releases the sun gear 63s from the transmission case 29 such that they can rotate. The brake B2 fixes (connects) the carrier 63c of the planetary gear 63 and the ring gear 64r of the planetary gear 64 to the transmission case 29 such that they cannot rotate, and releases the carrier 63c and the ring gear 64r from the transmission case 29 such that they can rotate. The one-way clutch F1 permits rotation in one direction of the carrier 63c of the planetary gear 63 and the ring gear 64r of the planetary gear 64 and restricts rotation in the reverse direction.

The clutches C1 and C2 are configured as multi-disc frictional hydraulic clutches (frictional engagement elements) including a hydraulic servo, and the brakes B1 and B2 are configured as multi-disc frictional hydraulic brakes (frictional engagement elements) including a hydraulic servo. The hydraulic servo includes a piston, a plurality of frictional engagement plates (for example, a frictional plate and a separator plate), and an oil chamber (an engagement oil chamber and a cancelling oil chamber) which is supplied with hydraulic oil or the like. The clutches C1 and C2 and the brakes B1 and B2 operate with a hydraulic oil supplied from the hydraulic pressure control device 68.

FIG. 3 is an operation table illustrating a relationship between gear stages of the transmission 61 and operation states of the clutches C1 and C2, the brakes B1 and B2, and the one-way clutch F1. In the transmission 61, first to fourth forward gear stages or a reverse gear stage are formed by engaging or disengaging the clutches C1 and C2, the brakes B1 and B2, and the one-way clutch F1 as illustrated in FIG. 3.

Specifically, a first forward gear stage is formed by engaging the clutch C1, disengaging the clutch C2 and the brakes B1 and B2, and causing the one-way clutch F1 to operate (restricting rotation in the reverse direction of the carrier 63c of the planetary gear 63 and the ring gear 64r of the planetary gear 64). At the first forward gear stage, the brake B2 is also engaged when a braking force is output to the input shaft 61i of the transmission 61 by regenerative driving of the motor MG2 or motoring of the motor MG1 of the engine 22 with injection of fuel stopped.

A second forward gear stage is formed by engaging the clutch C1 and the brake B1 and disengaging the clutch C2 and the brake B2. A third forward gear stage is formed by engaging the clutches C1 and C2 and disengaging the brakes B1 and B2. A fourth forward gear stage is formed by engaging the clutch C2 and the brake B1 and disengaging the clutch C1 and the brake B2. A reverse gear stage is formed by engaging the clutch C1 and the brake B2 and disengaging the clutch C2 the brake B1.

The hydraulic pressure control device 68 is connected to a mechanical oil pump or an electrical oil pump (none of which is illustrated) that can suck and eject hydraulic oil from a hydraulic oil reservoir of the transmission case 29 (see FIG. 2) via a strainer, and generates a hydraulic pressure which is supplied to the clutches C1 and C2 and the brakes B1 and B2 of the transmission 61 using the hydraulic oil from the mechanical oil pump or the electrical oil pump or supplies the hydraulic oil to the constituent parts of the transmission 61 (for example, rotary members, bearings, and frictional engagement plates such as the clutches C1 and C2 and the brakes B1 and B2) for lubrication or cooling. The mechanical oil pump is driven by the engine 22.

The hydraulic pressure control device 68 includes a regulator valve (not illustrated) that adjusts the hydraulic pressure from the mechanical oil pump or the electrical oil pump and generates a source pressure (a line pressure) and a plurality of pressure control valves (not illustrated) that controls the source pressure and supplies the controlled source pressure to the clutches C1 and C2 or the brakes B1 and B2.

The cooling device 70 includes an oil cooler 71 that performs heat exchange between the hydraulic oil supplied from the regulator valve of the hydraulic pressure control device 68 and a refrigerant, a radiator 72 that performs heat exchange between the refrigerant and air (traveling air), and an electric pump 73 that circulates the refrigerant to the oil cooler 71 and the radiator 72. The cooling device 70 cools the refrigerant by heat exchange between the refrigerant and the air in the radiator 72 and cools the hydraulic oil by heat exchange between the refrigerant and the hydraulic oil in the oil cooler 71. The hydraulic oil which has been supplied from the regulator valve of the hydraulic pressure control device 68 and cooled by the cooling device 70 is supplied to the constituent parts of the transmission 61 for lubrication or cooling.

The HVECU 78 includes a microprocessor including a CPU, a ROM, a RAM, input and output ports, and a communication port. Signals from various sensors are input to the HVECU 78 via the input port. Examples of the signals input to the HVECU 78 include a rotation speed Nd of the drive shaft 36 from a rotation speed sensor 36a that detects the rotation speed of the drive shaft 36, an oil temperature To of a hydraulic oil from an oil temperature sensor 69 that detects the oil temperature of the hydraulic oil of the transmission 61, a refrigerant temperature Tc from a temperature sensor 74 that detects a temperature of a refrigerant of the cooling device 70, an ignition signal from an ignition switch 80, and a shift position SP from a shift position sensor 82 that detects an operation position of a shift lever 81. Examples thereof further include an accelerator opening Acc from an accelerator pedal position sensor 84 that detects an amount of depression of an accelerator pedal 83 and a brake pedal position BP from a brake pedal position sensor 86 that detects an amount of depression of a brake pedal 85. Examples thereof further include a vehicle speed V from a vehicle speed sensor 88, a vehicle longitudinal acceleration (hereinafter referred to as a "longitudinal acceleration") Ax and a vehicle lateral acceleration (hereinafter referred to as a "lateral acceleration") Ay from an acceleration sensor 89. A parking position (P position), a reverse position (R position), a neutral position (N position), a forward position (D position), and the like are provided as the shift position SP.

A control signal for the hydraulic pressure control device 68 of the transmission 60, a control signal for the electrical oil pump (not illustrated), a control signal for the electric pump 73 of the cooling device 70, and the like are output from the HVECU 78 via the output port. The HVECU 78 is connected to the engine ECU 24, the motor ECU 40, and the battery ECU 52 via the communication port as described above. The HVECU 78 is connected to a vehicle-side communication device which is not illustrated and can communicate wirelessly with a cloud server 100 via the vehicle-side communication device.

The cloud server 100 is connected to a server-side communication device which is not illustrated and can communicate wirelessly with vehicles including the hybrid vehicle 20 via the server-side communication device. The cloud server 100 includes a processing device 102 and a storage device 104. The processing device 102 includes a CPU, a ROM, a RAM, a flash memory, input and output ports, and a communication port. The storage device 104 is configured as a hard disk or a solid state drive (SSD). The storage device 104 stores travel history information (for example, history information on the accelerator opening Acc, the vehicle speed V, the rotation speed Ne of the engine 22, the gear stage Gs of the transmission 61, the refrigerant temperature Tc of the cooling device 70, the longitudinal acceleration Ax, and the lateral acceleration Ay, and the like) of vehicles and the like. The cloud server 100 corresponds to a "cause identifying device" in this embodiment.

The hybrid vehicle 20 according to this embodiment having the above-mentioned configuration performs hybrid travel (HV travel) in which the hybrid vehicle 20 travels with operation of the engine 22 and motor-driven travel (EV travel) in which the hybrid vehicle 20 travels without operation of the engine 22. A routine for controlling the engine 22, the motors MG1 and MG2, and the transmission 61 in a hybrid travel mode or an EV travel mode will be described below.

Control of the engine 22 or the motors MG1 and MG2 is performed as follows. In the HV travel mode, the HVECU 78 sets a required torque Tin* which is required for the input shaft 61i of the transmission 61 based on the accelerator opening Acc, the vehicle speed V, and the gear stage Gs of the transmission 61 and calculates a required power Pin* which is required for the input shaft 61i by multiplying the set required torque Tin* by the rotation speed Nin of the input shaft 61i of the transmission 61 (the rotation speed Nm2 of the motor MG2). Subsequently, the HVECU 78 sets a required power Pe* which is required for the engine 22 by subtracting a required charging/discharging power Pb* (which is positive when electric power is discharged from the battery 50) of the battery 50 from the required power Pin*. Then, the HVECU 78 sets a target rotation speed Ne* or a target torque Te* of the engine 22 and torque commands Tm1* and Tm2* of the motors MG1 and MG2 such that the required power Pe* is output from the engine 22 and the required torque Tin* is output to the input shaft 61i of the transmission 61, transmits the target rotation speed Ne* or the target torque Te* of the engine 22 to the engine ECU 24, and transmits the torque command Tm1* and Tm2* of the motors MG1 and MG2 to the motor ECU 40. The engine ECU 24 performs operation control of the engine 22 (for example, intake air control, fuel injection control, and ignition control) such that the engine 22 operates based on the target rotation speed Ne* and the target torque Te*. The motor ECU 40 performs driving control of the motors MG1 and MG2 (switching control of the plurality of switching elements of the inverters 41 and 42) such that the motors MG1 and MG2 operate with the torque command Tm1* and Tm2*.

In the EV travel mode, similarly to the HV travel mode, the HVECU 78 sets the required torque Tin* of the input shaft 61i of the transmission 61, sets the torque command Tm1* of the motor MG1 to 0, sets the torque command Tm2* of the motor MG2 such that the required torque Tin* is output to the input shaft 61i of the transmission 61, and transmits the torque command Tm1* and Tm2* of the motors MG1 and MG2 to the motor ECU 40. Driving control of the motors MG1 and MG2 by the motor ECU 40 is the same as described above.

Control of the transmission 61 is performed as follows. In the HV travel mode or the EV travel mode, the HVECU 78 sets a target gear stage Gs* of the transmission 61 based on the accelerator opening Acc and the vehicle speed V and controls the hydraulic pressure control device 68 such that the gear stage Gs of the transmission 61 becomes the target gear stage Gs*. When the oil temperature To of the hydraulic oil of the gear shifting device 60 becomes equal to or greater than a threshold value Toref, the HVECU 78 transmits an oil temperature abnormality signal to the cloud server 100.

Figure 4:
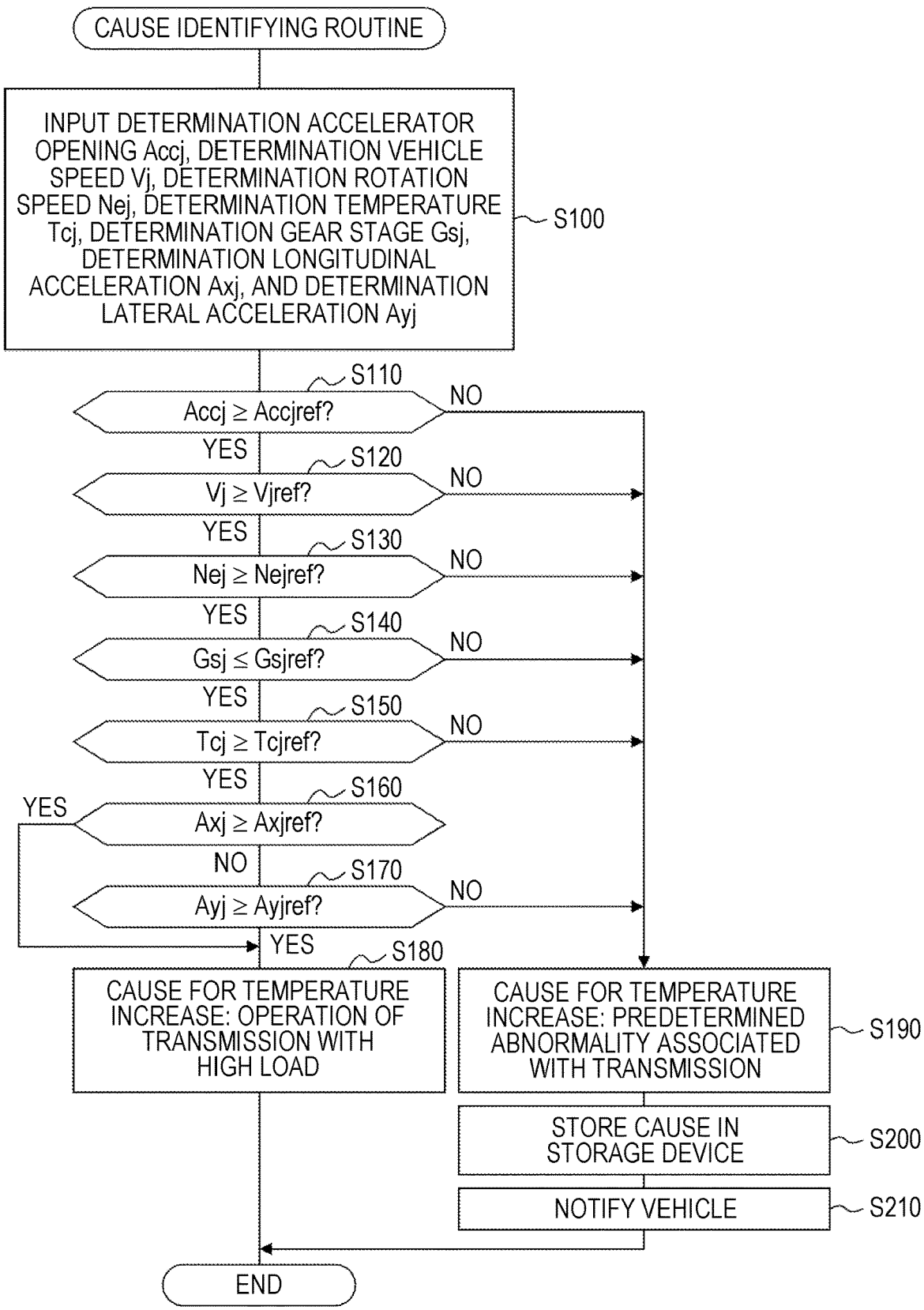
FIG. 4 is a flowchart illustrating an example of a cause identifying routine which is performed by a processing device 102 of the cloud server 100.

The operation of the cloud server 100 according to this embodiment having the above-mentioned configuration, particularly, the operation of identifying a cause for an excessive increase in oil temperature when the oil temperature To of the hydraulic oil of the gear shifting device 60 of the hybrid vehicle 20 becomes equal to or greater than a threshold value Toref (when an oil temperature abnormality signal is received from the hybrid vehicle 20), will be described below. FIG. 4 is a flowchart illustrating an example of a cause identifying routine which is performed by the processing device 102 of the cloud server 100. This routine is performed when an oil temperature abnormality signal is received from the hybrid vehicle 20.

When the cause identifying routine illustrated in FIG. 4 is performed, the processing device 102 of the cloud server 100 first inputs data such as a determination accelerator opening Accj, a determination vehicle speed Vj, a determination rotation speed Nej of the engine 22, a determination gear stage Gsj of the transmission 61, a determination temperature Tcj of the refrigerant of the cooling device 70, a determination longitudinal acceleration Axj, and a determination lateral acceleration Ayj based on the travel history information of the hybrid vehicle 20 which is stored in the storage device 104 (Step S100).

Figure 5:
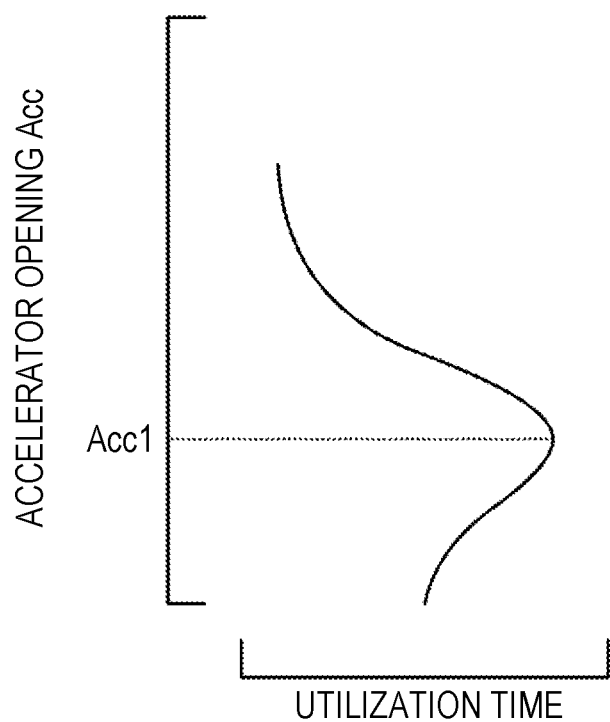
FIG. 5 is a diagram illustrating an example of a utilization time distribution of an accelerator opening Acc in a target time.

Here, the determination accelerator opening Accj is set based on a utilization time distribution of the accelerator opening Acc in a target period (for example, about 1 minute to 5 minutes) immediately before the oil temperature abnormality signal is received from the hybrid vehicle 20. FIG. 5 is a diagram illustrating an example of the utilization time distribution of the accelerator opening Acc in the target period. In the embodiment, a value of the longest utilization time (a value Acc1 in FIG. 5) in the utilization time distribution of the accelerator opening Acc in the target period is set as the determination accelerator opening Accj. Similarly, values of the longest utilization times in the utilization time distributions of the vehicle speed V, the rotation speed Ne of the engine 22, the gear stage Gs of the transmission 61, the refrigerant temperature Tc of the cooling device 70, the longitudinal acceleration Ax, and the lateral acceleration Ay in the target period are set as the determination vehicle speed Vj, the determination rotation speed Nej of the engine 22, the determination gear stage Gsj of the transmission 61, the determination temperature Tcj of the refrigerant of the cooling device 70, the determination longitudinal acceleration Axj, and the determination lateral acceleration Ayj, respectively.

When data is input in this way, the determination accelerator opening Accj is compared with a threshold value Accjref (Step S110), the determination vehicle speed Vj is compared with a threshold value Vjref (Step S120), the determination rotation speed Nej of the engine 22 is compared with a threshold value Nejref (Step S130), the determination gear stage Gsj of the transmission 61 is compared with a threshold value Gsjref (Step S140), and the determination temperature Tcj of the refrigerant of the cooling device 70 is compared with a threshold value Tcjref (Step S150). Here, the threshold values Accjref, Vjref, Nejref, Gsjref, and Tcjref are threshold values which are used to determine whether the transmission 61 has operated with a predetermined high load in the target period.

When it is determined in Step S110 that the determination accelerator opening Accj is equal to or greater than the threshold value Accjref, it is determined in Step S120 that the determination vehicle speed Vj is equal to or greater than the threshold value Vjref, it is determined in Step S130 that the determination rotation speed Nej of the engine 22 is equal to or greater than the threshold value Nejref, it is determined in Step S140 that the determination gear stage Gsj of the transmission 61 is equal to or less than the threshold value Gsjref, and it is determined in Step S150 that the determination temperature Tcj of the refrigerant of the cooling device 70 is equal to or greater than the threshold value Tcjref, it is determined that the transmission 61 has operated with a predetermined high load in the target period.

Then, the determination longitudinal acceleration Axj is compared with a threshold value Axref (Step S160) and the determination lateral acceleration Ayj is compared with a threshold value Ayref (Step S170). Here, the threshold values Axref and Ayref are threshold values which are used to determine whether the vehicle acceleration in the target period is high.

Meanings of the processes of Steps S110 to S150 and the processes of Steps S160 and S170 will be described below. When the transmission 61 has operated with a predetermined high load in the target period, an amount of heat which has been emitted from the transmission 61 in the target period is higher in comparison with a case in which the transmission 61 has not operated with a predetermined high load in the target period (has operated with a low load). When the vehicle acceleration in the target period is high, a wobble of the hydraulic oil in the transmission 60 increases, an amount of contact between the constituent parts of the transmission 61 (for example, rotary members, bearings, and frictional engagement plates such as the clutches C1 and C2 and the brakes B1 and B2) and the hydraulic oil increases, and an amount of heat exchanged therebetween is higher in a comparison with a case in which the vehicle acceleration in the target period is low. Accordingly, when the amount of heat which has been emitted from the transmission 61 in the target period is large and the amount of heat which has been exchanged between the constituent parts of the transmission 61 and the hydraulic oil is large, it is assumed that the gear shifting device 60 is normal even if the oil temperature To of the hydraulic oil has been equal to or greater than the threshold value Toref. On the other hand, when the amount of heat which has been emitted from the transmission 61 in the target period is small and the amount of heat which has been exchanged between the constituent parts of the transmission 61 and the hydraulic oil is small, it is assumed that there is a low likelihood that the oil temperature To of the hydraulic oil will be equal to or greater than the threshold value Toref and thus it is assumed that a predetermined abnormality associated with the gear shifting device 60 has occurred when the oil temperature To of the hydraulic oil becomes equal to or greater than the threshold value Toref. The processes of Steps S110 to S150 and the processes of Steps S160 and S170 are performed to determine whether the predetermined abnormality has occurred in consideration thereof.

The predetermined abnormality includes at least one of an abnormality of an excess amount of hydraulic oil, an abnormality of deterioration of the hydraulic oil, and an abnormality of the cooling device 70 (such as the oil cooler 71 or the radiator 72). When an abnormality of an excess amount of hydraulic oil occurs, a stirring loss of the hydraulic oil in the transmission case 29 is likely to increase and the oil temperature To of the hydraulic oil is likely to have been equal to or greater than the threshold value Toref. The abnormality of an excess amount of hydraulic oil is caused, for example, when an operator injects an excessive amount of hydraulic oil into the transmission case 29 at the time of manufacturing, repairing, or maintaining a vehicle. When an abnormality of deterioration of the hydraulic oil occurs and thus air is mixed, an oil level of the hydraulic oil rises and thus a stirring loss of the hydraulic oil in the transmission case 29 is likely to increase and the oil temperature To of the hydraulic oil is likely to have been equal to or greater than the threshold value Toref. When an abnormality occurs in the cooling device 70, the amount of heat which has been exchanged between the refrigerant and air in the radiator 72 decreases or the amount of heat which has been exchanged between the refrigerant and air in the oil cooler 71 decreases and thus the hydraulic oil is not sufficiently cooled and the oil temperature To of the hydraulic oil is likely to have been equal to or greater than the threshold value Toref.

When it is determined in Steps S110 to S150 that the transmission 61 has operated with a predetermined high load in the target period, it is determined that the vehicle acceleration in the target period was high when it is determined in Step S160 that the determination longitudinal acceleration Axj is equal to or greater than the threshold value Axref or when it is determined in Step S170 that the determination lateral acceleration Ayj is equal to or greater than the threshold value Ayref. In this case, it is determined that the operation of the transmission 61 with the predetermined high load is a cause of the oil temperature To of the hydraulic oil having been equal to or greater than the threshold value Toref (Step S180) and this routine ends.

On the other hand, when it is determined in Step S160 that the determination longitudinal acceleration Axj is less than the threshold value Axref and it is determined in Step S170 that the determination lateral acceleration Ayj is less than the threshold value Ayref, it is determined that the oil temperature To of the hydraulic oil has been equal to or greater than the threshold value Toref even if the vehicle acceleration in the target period is not high (the amount of heat which has been exchanged between the constituent parts of the transmission 61 and the hydraulic oil is not great and the likelihood that the oil temperature To will have been equal to or greater than the threshold value Toref is low). In this case, it is determined that occurrence of the predetermined abnormality is a cause of the oil temperature To of the hydraulic oil having been equal to or greater than the threshold value Toref (Step S190), the determination result is stored in the storage device 104 (Step S200) and is transmitted to the hybrid vehicle 20 (Step S210) and then this routine ends.

When it is determined in Step S110 that the determination accelerator opening Accj is less than the threshold value Accjref, when it is determined in Step S120 that the determination vehicle speed Vj is less than the threshold value Vjref, when it is determined in Step S130 that the determination rotation speed Nej of the engine 22 is less than the threshold value Nejref, when it is determined in Step S140 that the determination gear stage Gsj of the transmission 61 is less than the threshold value Gsjref, or when it is determined in Step S150 that the determination temperature Tcj of the refrigerant of the cooling device 70 is less than the threshold value Tcjref, it is determined that the oil temperature To of the hydraulic oil has been equal to or greater than the threshold value Toref even if the transmission 61 has not operated with the predetermined high load (the amount of heat which has been emitted from the transmission 61 is not great and the likelihood that the oil temperature To will have been equal to or greater than the threshold value Toref is low). In this case, it is determined that occurrence of the predetermined abnormality is a cause of the oil temperature To of the hydraulic oil having been equal to or greater than the threshold value Toref (Step S190), the determination result is stored in the storage device 104 (Step S200) and is transmitted to the hybrid vehicle 20 (Step S210) and then this routine ends.

When a notification indicating that occurrence of the predetermined abnormality is a cause of the oil temperature To of the hydraulic oil having been equal to or greater than the threshold value Toref is received from the cloud server 100, the hybrid vehicle 20 turns on a warning lamp (not illustrated) or notifies a driver that it is to be brought to a dealer or the like.

In the cloud server 100 which is the cause identifying device according to the above embodiment, when the oil temperature To of the hydraulic oil in the gear shifting device 60 has been equal to or higher than the threshold value Toref, it is determined that the operation of the transmission 61 with a predetermined high load is a cause of the oil temperature To of the hydraulic oil having been equal to or higher than the predetermined threshold value Toref when predetermined conditions that the transmission 61 has operated with the predetermined high load in the immediately previously target period and the vehicle acceleration (the determination longitudinal acceleration Axj or the determination lateral acceleration Ayj) in the target period has been equal to or higher than the threshold value are satisfied, and it is determined that occurrence of a predetermined abnormality associated with the gear shifting device 60 is the cause of the oil temperature To of the hydraulic oil having been equal to or higher than the threshold value Toref when the predetermined conditions are not satisfied. In this way, it is possible to identify the cause of the oil temperature To of the hydraulic oil in the gear shifting device 60 having been equal to or greater than the threshold value Toref.

In the above embodiment, in the utilization time distribution of the accelerator opening Acc in the target period, a value of the longest utilization time is set as the determination accelerator opening Accj. However, a median value, an average value, a third quartile, or the like in the utilization time distribution of the accelerator opening Acc in the target period may be set as the determination accelerator opening Accj. The same can be considered for the determination vehicle speed Vj, the determination rotation speed Nej of the engine 22, the determination gear stage Gsj of the transmission 61, the determination temperature Tcj of the refrigerant of the cooling device 70, the determination longitudinal acceleration Axj, and the determination lateral acceleration Ayj.

In the above embodiment, it is determined whether the transmission 61 has operated with the predetermined high load in the target period using the determination accelerator opening Accj, the determination vehicle speed Vj, the determination rotation speed Nej of the engine 22, the determination gear stage Gsj of the transmission 61, and the determination temperature Tcj of the refrigerant of the cooling device 70. However, it may be determined whether the transmission 61 has operated with the predetermined high load in the target period using some of the determination accelerator opening Accj, the determination vehicle speed Vj, the determination rotation speed Nej of the engine 22, the determination gear stage Gsj of the transmission 61, and the determination temperature Tcj of the refrigerant of the cooling device 70. A determination rotation speed Ninj based on the utilization time distribution of the rotation speed Nin of the input shaft 61i of the transmission 61 in the target period may be used instead of the determination rotation speed Nej of the engine 22.

In the above embodiment, when the oil temperature To of the hydraulic oil in the gear shifting device 60 of the hybrid vehicle 20 has been equal to or greater than the threshold value Toref, the cloud server 100 identifies the cause thereof. However, when the oil temperature To of the hydraulic oil in the gear shifting device 60 has been equal to or greater than the threshold value Toref, the HVECU 78 of the hybrid vehicle 20 may identify the cause thereof. In this case, the travel history information (such as the utilization time distribution of the accelerator opening Acc in the target period) which is used to identify the cause of the oil temperature To of the hydraulic oil in the gear shifting device 60 having been equal to or greater than the threshold value Toref may be stored in the storage device 104 of the cloud server 100 or may be stored in a storage device (not illustrated) of the HVECU 78 of the hybrid vehicle 20.

Figure 6:
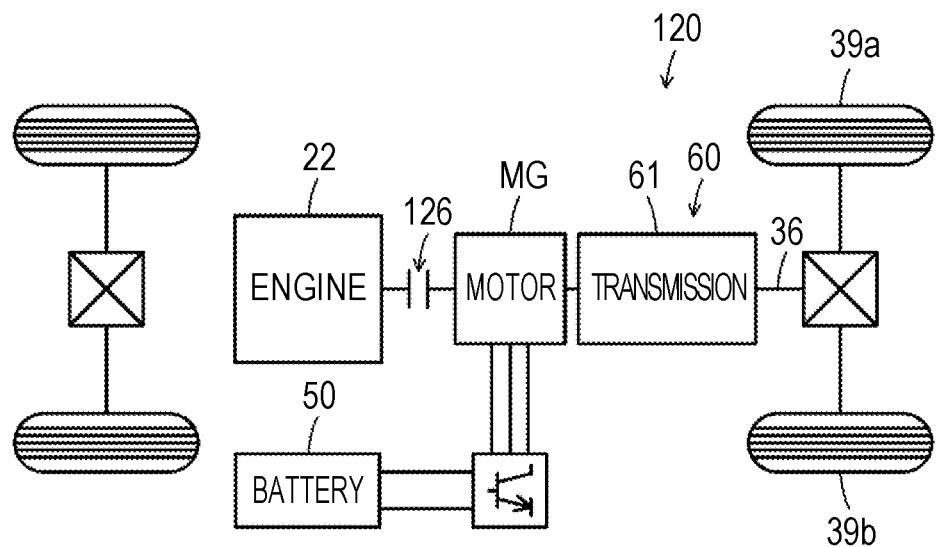
FIG. 6 is a diagram schematically illustrating a configuration of a hybrid vehicle 120 according to a modified example.
Figure 7:
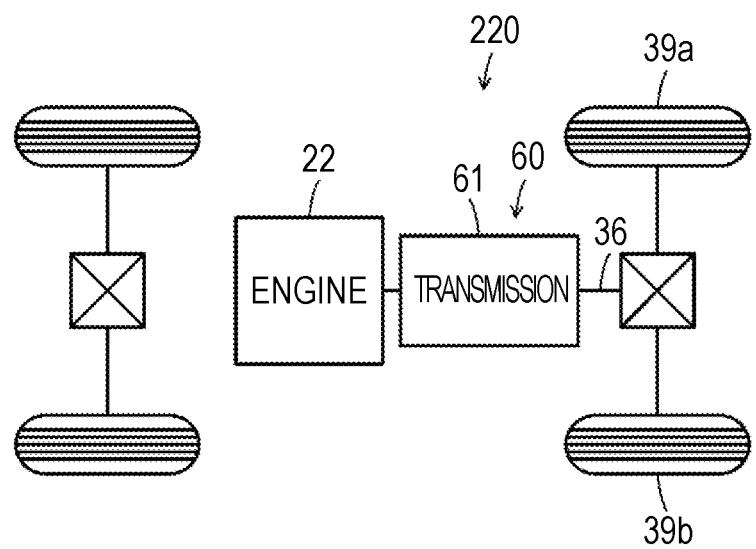
FIG. 7 is a diagram schematically illustrating a configuration of a vehicle 220 according to a modified example.

In the above embodiment, when the oil temperature To of the hydraulic oil in the gear shifting device 60 of the hybrid vehicle 20 has been equal to or greater than the threshold value Toref, the cause thereof is identified. However, when an oil temperature of a hydraulic oil in a gear shifting device with a transmission of a vehicle other than the hybrid vehicle 20 has been equal to or greater than the threshold value Toref, the cause thereof may be identified. For example, the vehicle other than the hybrid vehicle 20 may be a hybrid vehicle 120 in which a motor MG is connected to the drive shaft 36 connected to the driving wheels 39a and 39b via the transmission 61 of the gear shifting device 60 and the engine 22 is connected to the motor MG via a clutch 126 as illustrated in FIG. 6. As illustrated in FIG. 7, the vehicle may be a general vehicle 220 in which a motor is not provided and the engine 22 is connected to the drive shaft 36 connected to the driving wheels 39a and 39b via the transmission 61 of the gear shifting device 60. The vehicle may be an electric vehicle in which in which the engine 22 of the vehicle 220 illustrated in FIG. 7 is replaced with a motor.

The correspondence between the principal elements in the embodiment and the principal elements of the present disclosure described in the SUMMARY does not limit the elements of the present disclosure described in the SUMMARY, because the embodiment is an example for specifically describing an aspect of the present disclosure described in the SUMMARY. That is, it should be noticed that the present disclosure described in the SUMMARY has to be construed based on the description of the SUMMARY and the embodiment is only a specific example of the present disclosure described in the SUMMARY.

While an embodiment of the present disclosure has been described above with reference to the drawings, an applicable embodiment of the present disclosure is not limited to the embodiment and can be modified in various forms without departing from the gist of the present disclosure.

The present disclosure is applicable to industries for manufacturing a cause identifying device.

What is claimed is:

1. A cause identifying device that identifies a cause when an oil temperature of a hydraulic oil of a gear shifting device including a transmission which transmits power from a drive source to driving wheels by gear shifting has been equal to or higher than a predetermined temperature, the cause identifying device performing:
   determining that an operation of the transmission with a predetermined high load is a cause of the oil temperature of the hydraulic oil having been equal to or higher than the predetermined temperature when predetermined conditions that the transmission has operated with the predetermined high load in a target period immediately before the oil temperature of the hydraulic oil has been equal to or higher than the predetermined temperature and a vehicle acceleration in the target period has been equal to or higher than a predetermined acceleration value are satisfied; and
   determining that occurrence of a predetermined abnormality associated with the gear shifting device is the cause of the oil temperature of the hydraulic oil having been equal to or higher than the predetermined temperature when the predetermined conditions are not satisfied.

2. The cause identifying device according to claim 1, wherein the cause identifying device performs determining whether the transmission has operated with the predetermined high load in the target period based on at least one of an accelerator operation amount, a vehicle speed, a rotation speed of the drive source, a gear stage of the transmission, and a temperature of a refrigerant in a cooling device that cools the hydraulic oil in the target period.

3. The cause identifying device according to claim 1, wherein the predetermined abnormality is an abnormality associated with the hydraulic oil.

4. The cause identifying device according to claim 3, wherein the predetermined abnormality includes at least one of an abnormality of an excess amount of hydraulic oil, an abnormality of deterioration of the hydraulic oil, and an abnormality of a cooling device that cools the hydraulic oil.

* * * * *